United States Patent [19]

Thompson, III

[11] 4,451,440

[45] May 29, 1984

[54] UTILIZATION OF ION EXCHANGE RESIN IN THE PROCESSING OF KAOLINS

[75] Inventor: Thomas D. Thompson, III, Upper Black Eddy, Pa.

[73] Assignee: Georgia Kaolin Company, Inc., Elizabeth, N.J.

[21] Appl. No.: 437,610

[22] Filed: Oct. 28, 1982

[51] Int. Cl.$^3$ ............................................. C01G 15/00
[52] U.S. Cl. .................................... 423/112; 423/264; 423/131; 423/327; 423/DIG. 14; 106/288 B; 106/308 B; 501/146; 501/148; 210/685; 210/688
[58] Field of Search ............... 423/327, 112, 130, 131, 423/264, DIG. 14; 501/148, 146, 145; 210/685, 686, 688; 106/288 B, 308 B

[56] References Cited

U.S. PATENT DOCUMENTS

| 2,500,727 | 3/1950 | Whittaker | 423/112 |
| 3,130,063 | 4/1964 | Millman et al. | 106/288 B |
| 4,002,487 | 1/1977 | Conley | 106/288 B |
| 4,374,203 | 2/1983 | Thompson et al. | 501/148 |

OTHER PUBLICATIONS

*Amberlite Ion Exchange Resins Laboratory Guide*, Rohm and Haas Company, Philadelphia, Sep. 1979.
Hawley; G. Gessner, *The Condensed Chemical Dictionary*, Ninth Edition, Van Nostrand Reinhold Company, New York, 1977, pp. 38 and 471.

*Primary Examiner*—John Doll
*Assistant Examiner*—Jackson Leeds
*Attorney, Agent, or Firm*—William W. Habelt

[57] ABSTRACT

A method of processing naturally occurring kaolin clay wherein ion exchange resins are utilized to remove charged soluble impurities from the clay thereby eliminating the filtration step required in conventional clay beneficiation process. Further, by saturating the ion exchange resin utilized with a bleaching agent, ferric ions in the clay will be reduced to soluble ferrous ions and removed from the clay without the conventional acid leaching.

8 Claims, No Drawings

UTILIZATION OF ION EXCHANGE RESIN IN THE PROCESSING OF KAOLINS

BACKGROUND OF THE INVENTION

The present invention relates generally to the processing of kaolin clays. More specifically, the present invention relates to repairing slurries of kaolin clay for shipment having improved rheological properties and brightness by a process in which ion exchange resins, in both cation and anion forms, are utilized in the beneficiation of the crude kaolin.

In the commercial processing and upgrading of naturally occurring kaolin clays, it is customary during the process of preparing the clay for shipment to bleach the clay to remove iron oxide impurities which discolor the clay to improve the brightness of the clay. The most common technique for removing the iron oxide impurities involves bleaching the clay with reducing agents to convert iron ions in the ferric state to the ferrous state. The ferrous ion, being more soluble than the ferric ion is more readily removed by conventional operations involving washing, dewatering and filtering.

In a conventional commercial process for producing a clay slurry, typically at 70% solids for shipment, the crude clay is first blunged in water with a dispersing agent to form a clay in water suspension. After degritting and fractionation to the desired particle size, the fine particle clay fraction is typically diluted with water to a 15-40% solids content suspension and acidified to a pH in the range of 2-3. A bleaching compound, typically a reducing agent containing the dithionite ion, is added to the acidified clay fraction to reduce the ferric ions in the clay to the ferrous state. After allowing the clay fraction to react with the reducing agent for a period of approximately one hour, the clay fraction is filtered, rinsed and dried to a 70% solids concentration for slurry shipment. Additionally, the dried clay slip may be pulverized to eliminate any lumps formed during the filtering and drying process.

The acid leaching and filtration steps are necessary not only to achieve the required brightness improvement, but also to increase solids and remove excess sulfate ions, soluble iron impurities and reducing agent by-products, all of which affect final product brightness and rheology. Unfortunately, the acid leaching and filtration steps are relatively costly operations to perform. Additionally, if the acid leaching step were eliminated, the kaolin crude could be processed at a higher solids content than presently practicible.

SUMMARY OF THE INVENTION

Therefore, it is a general object of the present invention to provide an improved process for upgrading naturally occurring kaolin clays.

It is a more specific object of the present invention to provide an improved process for preparing kaolin clays for shipment wherein the rheological properties and brightness of the clay is enhanced.

It is a further object of the present invention to provide such a preparation process wherein the conventional acid leaching step is eliminated.

It is a still further object of the present invention to provide such a preparation process wherein the conventional filtration step is eliminated.

The present invention, therefore, provides a method of processing naturally occurring kaolin clay wherein ion exchange resins are utilized to remove charged soluble impurities from the clay thereby eliminating the filtration step required in conventional clay beneficiation process. Furthermore, by saturating the ion exchange resin utilized with a bleaching agent, ferric ions in the clay will be reduced to soluble ferrous ions and removed from the clay without the conventional acid leaching.

In accordance with the present invention, an aqueous suspension of crude kaolin clay having a solids content of at least about 50% is prepared and fractionated into a fine particle clay slip and a coarse particle clay slip. The fine particle clay slip is then reacted with an aqueous bleaching agent and an ion exchange resin. A portion of the reacted fine particle clay slip is then dried and blended with the redispersed filter cake to a predetermined solids content, typically 70%, and prepared for shipment.

In one embodiment of the present invention, the fine particle clay slip is first reacted with an aqueous bleaching agent, preferably a dithionite bleaching agent, and thence reacted in series first with a strongly acidic cation exchange resin and subsequently with a strongly basic anion exchange resin.

In a further embodiment of the present invention, the fine particle clay slip is first reacted with an aqueous bleaching agent, again preferably a dithionite bleaching agent, and thence reacted simultaneously with both a strongly acidic cation exchange resin and a strongly basic anion exchange resin, preferably, by passing the bleached fine particle clay slip through an ion exchange bed comprising a mixture of strongly acidic cation exchange resin and strongly basic anion exchange resin. Preferably, the ion exchange bed is saturated with a sodium phosphate salt.

Although, in general, a wide range of specific forms of sodium phosphate salt may be utilized to saturate the ion exchange bed, tribasic sodium phosphate is preferred because of its ability to enchance both the rheological properties and the brightness of the resultant clay product.

DESCRIPTION OF THE PREFERRED EMBODIMENTS

The present invention can be better understood with reference to the following examples and discussion thereof presented hereinafter. These examples are to be regarded as illustrative, but not in any way limiting, of the present invention.

EXAMPLE I

A 70% solids aqueous suspension of kaolin clay was prepared by blunging crude clay in water with 0.3% sodium hexametaphosphate and sodium hydroxide at a pH of 6.0. The slurry was then fractionated to 0.05 cps at 10 minutes. The recovered fine particle clay fraction was then diluted with water to a 15-20% solids content and the pH adjusted to 3.0 by the addition of sulfuric acid. The fraction was then treated with sodium dithionite at a level of 4 lb./ton of clay. After allowing a period of one hour for reaction, the fraction was then filtered and rinsed. The filter cake, i.e., the product clay, was dried and pulverized to eliminate lumps formed in the filtering and drying steps. A 70% solids slurry was made using dried and pulverized filter cake plus the appropriate amount of water and dispersing agent.

EXAMPLE II

A 70% solids aqueous suspension of kaolin clay was prepared by blunging crude clay in water with 0.3% sodium hexamethaphosphate and sodium hydroxide at a pH of 6.0. The slurry was then fractionated to 0.05 cps at 10 minutes. The recovered fine particle clay fraction was then treated with a solution of sodium dithionite dissolved in water at a treatment level of 4 lbs. of sodium dithionite per ton of clay. The addition of the sodium dithionite solution resulted in a drop in the solids content of the clay fraction to 61.7%. The clay fraction and sodium dithionite solution was then heated to 50° C. and allowed to react for a period of 30 minutes. After the 30-minute reaction period, a portion of the clay fraction equivalent to 400 grams of dry kaolin was added to 50 ml. of Amberlite IR-120 cation exchange resin saturated with sodium ion. The mixture was then stirred for 15 minutes to allow ion exchange to occur. After the 15-minute reaction period, the clay fraction was screened through a 100 mesh screen and then added to 100 ml. of Amberlite IRA-402 anion exchange resin saturated with hydroxide ion. The mixture was then stirred for 15 minutes to allow ion exchange to occur, then screened through 100 mesh screen and pan dried.

EXAMPLE III

Same as Example II except that the cation exchange resin was saturated with magnesium ion rather than sodium ion.

EXAMPLE IV

Same as Example I except that the cation exchange resin was saturated with calcium ion rather than sodium ion.

EXAMPLE V

Same as Example I except that the cation exchange resin was saturated with aluminum ion rather than sodium ion.

EXAMPLE VI

A 70% solids aqeous suspension of kaolin clay was prepared by blunging crude clay in water with 0.3% sodium hexamethaphosphate and sodium hydroxide at a pH of 6.0. The slurry was then diluted to 45% solids content and fractionated using a centrifuge to 0.05 cps at 10 minutes. The fine particle clay fraction, now having a solids content of 42%, was recovered and 360 ml. of the recovered fraction (equivalent to 200 grams of dry kaolin) was stirred into 200 ml. of Amberlite IRA-402 anion exchange resin saturated with dithionite ion. After a reaction time of 30 minutes, the clay fraction was separated from the resin by screening through a 100 mesh screen and then pan dried.

EXAMPLE VII

Same as Example VI except that the clay fraction was filtered after screening and prior to drying by conventional techniques.

EXAMPLE VIII

Same as Example VI except that after reaction with the anion exchange resin and screening through 100 mesh screen, the clay fraction was added to 100 ml. of cation exchange resin saturated with sodium ion and gently stirred for 15 minutes. After the 15 minute period, the clay fraction was separated from the resin by screening through a 100 mesh screen and then dried.

EXAMPLE IX

A 70% solids aqueous suspension of kaolin clay was prepared by blunging crude clay in water with 0.3% sodium hexametaphosphate and sodium hydroxide at a pH of 6.0. The slurry was then fractionated to 0.04 cps at 10 minutes. The solids content of the fine particle clay fraction was then reduced to 65% solids and then treated with a solution of sodium dithionite dissolved in a 5% solution of tetrasodium pyrophosphate in water at a treatment level of 4 lbs./ton of clay. The solids content of the clay fraction was thereby reduced to 63%. After a one-hour reaction period, the clay fraction was then pumped at a rate of 25 ml. per minute through a mixed ion exchange bed column. The mixed bed column was composed of one part Amberlite IR-120 cation exchange resin and 2 parts IRA-402 anion exchange resin, which had been saturated with sodium hexametaphosphate. Excess phosphate salt was then rinsed out of the clay fraction by repeated washings with dionized water and the clay fraction was then dried.

EXAMPLE X

Same as Example IX except that the ion exchange bed was saturated with tetrasodium pyrophosphate rather than sodium hexametaphosphate.

EXAMPLE XI

Same as Example IX except that the ion exchange bed was saturated with dibasic sodium phosphate rather than sodium hexametaphosphate.

EXAMPLE XII

Same as Example IX except that the ion exchange resin was saturated with sodium tribasic phosphate rather than sodium hexametaphosphate.

In order to determine the optimum procedure for carrying out the method of the present invention of preparing crude kaolin clays for shipment as slurries, the Brookfield Viscosity and predispersed brightness of each of the product slurries from the previously described Examples were measured and compared. This comparison resulted in the discovery that the present invention for processing crude kaolin clays could not only lead to the elimination of the acid leaching step and the filtration step, in conventional crude clay processing, but also enhance the rheological properties and brightness of the beneficiated clay product.

The Brookfield Viscosity of the product clay slurry for each of Examples I–V was measured at 10 rpm and 70% solids concentration both for the slurry after initial drying to 70% solids and also after aging for 48 hours at a temperature of 50° C. The Brookfield Viscosity at 10 rpms was also measured for Examples IX–XII but only at 63% solids rather than 70% solids. No measurements of viscosity for the aged clay slurry of Examples IX–XII were taken. Further, no viscosity measurements at all were taken for the product slurries of Examples VI, VII and VIII.

Additionally, the predispersed brightness of each of the dried product clay slurries from the twelve Examples was measured in accordance with conventional techniques. The Brookfield Viscosity measurements and the predispersed brightness measurements are compared in Table I below. Each product clay slurry is identified by the Example nunber of its corresponding method of production. That is, sample no. 1 was produced in accordance with the procedure outlined hereinbefore in Example I, sample no. 2 using the procedure as outlined in Example II, and so on. Units on viscosity are in centipose, cPs.

TABLE I

| Sample | Brookfield Viscosity* Initial/Aged | Predispersed Brightness |
|---|---|---|
| 1 (conventional) | 1830/3780 | 86.0 |
| 2 | 410/710 | 87.2 |
| 3 | 440/2250 | 87.2 |
| 4 | 520/4670 | 87.9 |
| 5 | 410/970 | 86.9 |
| 6 | — | 85.6 |
| 7 | — | 86.8 |
| 8 | — | 87.2 |
| 9 | 240/— | 86.0 |
| 10 | 190/— | 85.9 |
| 11 | 250/— | 86.6 |
| 12 | 150/— | 86.2 |

*Brookfield Viscosity in centipose, measured at 10 rpm at a clay slurry solids content of 70% for examples 1-5, and of 63% for examples 9-12.

As illustrated by comparing the viscosity and brightness measurements for samples 2-4 with sample 1, the acid leaching and filtration steps of the conventional beneficiation process can be avoided by first bleaching the fine particle clay fraction of the fractionated clay and water dispersion and then subsequently reacting the bleached fine particle clay fraction with a cation exchange resin and then with a anion exchange resin in accordance with one embodiment of the present invention. This comparison illustrates that the acid leaching and filtration steps of the conventional process can be eliminated by practicing the method of the present invention while at the same time improving the predispersed brightness of the product clay slurry and, generally, also the viscosity of the product clay slurry.

Additionally, a comparison of samples 2-5 illustrates the influence of the particular cation used to saturate the cation exchange resin on the rheological and brightness properties of the resultant product clay slurry. The use of the calcium saturated ion exchange slurry (Example IV) resulted in the greatest brightness improvement over the conventional method but, unfortunately, resulted in poorer viscosity properties than the viscosity properties of the clay product from the conventional method (Example I). The use of sodium ion to saturate the cation exchange resin (Example II) resulted in a clay product having significantly improved predispersed brightness as well as the best rheological properties over the conventional method. Further, the use of magnesium ion to saturate the cation exchange resin (Example III) and also the use of the aluminum ion to saturate the cation exchange resin (Example V) resulted in clay products having improved brightness and rheological properties over the clay product produced by connventional methods (Example I).

A comparison of the viscosity measurements of the clay product samples 9-12 with sample 1 also illustrate that the acid leaching and filtration steps of the conventional beneficiation process can be eliminated by first bleaching the fine particle clay fraction of the fractionated clay dispersion with the dithionite ion dissolved in a 5% tetrasodium pyrophosphate solution, and then simultaneously reacting the bleached fine particle clay fraction with both a cation exchange resin and an anion exchange resin. In preparing samples 9-12, the bleached fine particle clay fraction was pumped through a mixed bed column comprised of one part strongly acidic cation exchange resin and two parts strongly basic anion exchange resin. The bed was also saturated with a sodium phosphate salt, the exact form of which varied with each sample. A comparison of samples 9-12 illustrates that although all tested forms of sodium phosphate provide significant viscosity improvements without any significant reduction in predispersed brightness, the use of tribasic sodium phosphate to saturate the mixed ion exchange bed appears to give the best results with regard to viscosity and brightness properties together over the conventional beneficiation process.

A comparison of samples 6, 7 & 8 with sample 1 illustrates that the acid leaching step can be eliminated and replaced by treating the fine particle fraction of the clay and water dispersion with an ion exchange resin saturated with dithionite ion. However, as shown by a comparison of samples 7 & 8 with sample 6, it is necessary to either subsequently filter the anion exchanged clay fraction or subsequently treat it with a cation exchange resin in order to improve brightness.

Ion exchange resins are synthetic resins containing active groups (usually sulphonic, carboxylic, phenol, or substituted amino groups) that give the resin the property of combining with or exchanging ions between the resin and a solution. Such resins may be strongly acidic, weakly acidic, strongly basic, or weakly basic and may have various levels of ion exchange capacity and porosity. The specific resins cited in the examples given in this specification, Amberlite IRA-402, and Amberlite IR-120, are well-known commercially available "gel-type" resins. "Amberlite" is a trademark of the Rohm & Haas Co. of Philadelphia, Pa., for several types of ion-exchange resins of insoluble cross-linked polymer type in minute bead form. More specifically, Amberlite IR-120 is a strongly acidic cation exchange resin comprising a styrene-divinylbenzene copolymer with a sulfonic acid as the functional group cation exchange. Amberlite IRA-402 is a strongly basic anion exchange resin comprising a styrene-divinylbenzene copolymer with a quaternary amine group as the functional group for anion exchange. It is to be understood that ion exchange resins which are capable of being saturated with the sodium cation and/or the phosphate anion for ion exchange with the clay slurry and which may be physically separated from the clay slurry, such as by screening through a 100 mesh screen as recited in the examples, may be utilized in processing naturally occurring kaolin clay in accordance with the method of the present invention.

It is to be understood that the examples discussed hereinbefore are presented by the Applicants to comply with the requirements of Title 35, paragraph 112 of the United States Code and are not intended to be regarded in any way as limiting the present invention. It will be appreciated that modifications may readily be made by those skilled in the art to the embodiments of the present invention alluded to herein. Therefore, it is intended by the appended claims to cover any such modifications which fall within the true spirit and scope of the present invention as set forth in the appended claims.

I claim:

1. A method of processing naturally occurring kaolin clay, comprising:
   (a) preparing an aqueous suspension of crude kaolin clay having a solids content of at least about 50%;
   (b) fractionating said kaolin suspension into a fine particle clay slip and a coarse particle residue;

(c) reacting the fine particle clay slip with an aqueous bleaching agent and an ion exchange resin saturated with sodium cations and an ion exchange resin saturated with phosphate anions; and (d) drying the reacted fine particle clay slip to a preselected solids content.

2. A method of processing a naturally occurring kaolin clay as recited in claim 1 wherein the step of reacting the fine particle clay slip with an aqueous bleaching agent and an ion exchange resin comprises:

(a) first, reacting the fine particle clay slip with an aqueous bleaching agent whereby ferric ions therein are reduced to ferrous ions;

(b) thence, subsequent to said bleaching step, reacting the fine particle clay slip with a strongly basic anion exchange resin saturated with phosphate anions;

(c) thence, screening the fine particle clay slip to remove the anion exchange resin;

(d) thence, reacting the screened fine particle clay slip with a strongly acidic cation exchange resin saturated with sodium ions; and (e) thence, screening the fine particle clay slip to remove the cation exchange resin.

3. A method of processing a naturally occurring kaolin clay as recited in claim 1 wherein the step of reacting the fine particle clay slip with an aqueous bleaching agent and an ion exchange resin comprises:

(a) first reacting the fine particle clay slip with an aqueous bleaching agent whereby ferric ions therein are reduced to ferrous ions;

(b) thence, subsequent to said bleaching step, reacting the fine particle clay slip with a strongly acidic cation exchange resin saturated with sodium ions (c) thence, screening the fine particle clay slip to remove the cation exchange resin;

(d) thence, subsequent to said cation-exchange step, reacting the screened fine particle clay slip with a strongly basic anion exchange resin saturated with phosphate ions; and (e) thence, screening the fine particle clay slip to remove the anion exchange resin.

4. A method as recited in claim 1 wherein reacting said fine particle clay slip with an aqueous bleaching agent and an anion exchange resin comprises:

(a) first reacting said fine particle clay slip with an aqueous bleaching agent whereby ferric ions therein are reduced to ferrous ions; and (b) thence, subsequent to said bleaching step, reacting the fine particle clay slip simultaneously with both a strongly acidic cation exchange resin and a strongly basic anion exchange resin by passing the bleached fine particle clay slip through an ion exchange bed comprising a mixture of strongly acidic cation exchange resin and strongly basic anion exchange resin saturated with a sodium phosphate salt.

5. A method as recited in claim 4 wherein said ion exchange bed comprises a mixture of one part strongly acidic cation exchange resin and two parts strongly basic anion exchange resin.

6. A method as recited in claim 4 wherein the sodium phosphate salt is selected from the group consisting of sodium hexametaphosphate, dibasic sodium phosphate, tribasic sodium phosphate, tetrasodium pyrophosphate and mixtures thereof.

7. A method as recited in claim 6 wherein the sodium phosphate salt is tribasic sodium phosphate.

8. A method as recited in claim 4 wherein the aqueous dithionite bleaching agent comprises sodium dithionite dissolved in an aqueous tetrasodium pyrophosphate solution.

* * * * *